(12) United States Patent
Burckard

(10) Patent No.: US 9,819,988 B2
(45) Date of Patent: *Nov. 14, 2017

(54) SECURITY DEVICE FOR PAY-TV RECEIVER DECODER

(71) Applicant: NAGRAVISION S.A., Cheseaux-sur-Lausanne (CH)

(72) Inventor: Antoine Burckard, Montigny le Bretonneux (FR)

(73) Assignee: NAGRAVISION S. A., Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/498,109

(22) Filed: Apr. 26, 2017

(65) Prior Publication Data

US 2017/0230703 A1 Aug. 10, 2017

Related U.S. Application Data

(63) Continuation of application No. 14/388,103, filed as application No. PCT/EP2013/056962 on Apr. 2, 2013, now Pat. No. 9,686,580.

(Continued)

(30) Foreign Application Priority Data

Mar. 30, 2012 (EP) .................................... 12162420

(51) Int. Cl.
*H04N 7/16* (2011.01)
*H04N 21/418* (2011.01)
(Continued)

(52) U.S. Cl.
CPC ..... *H04N 21/4181* (2013.01); *H04N 21/4367* (2013.01); *H04N 21/47211* (2013.01); *H04W 4/008* (2013.01)

(58) Field of Classification Search
CPC ............. H04N 21/418; H04N 21/4181; H04N 21/4182; H04N 21/4183; H04N 21/441
See application file for complete search history.

(56) References Cited

U.S. PATENT DOCUMENTS 5,563,948 A * 10/1996 Diehl .................. G06Q 20/341
348/E7.076
6,061,451 A * 5/2000 Muratani ............. H04N 7/1675
348/E7.056

(Continued)

FOREIGN PATENT DOCUMENTS

DE 10204832 8/2003
WO WO 99/57901 11/1999

(Continued)

OTHER PUBLICATIONS

International Search Report issued in International Application No. PCT/EP2013/056962 dated Jun. 13, 2013.

(Continued)

*Primary Examiner* — Randy Flynn
*Assistant Examiner* — Timothy Newlin
(74) *Attorney, Agent, or Firm* — DLA Piper LLP (US)

(57) ABSTRACT

The aim of the present invention is to ensure that a security module SC or CAM is used with an authorized receiver device. A security device for Pay-TV receiver decoder, in charge of processing the security messages and to extract the keys or rights from the security messages, this security device comprising a memory to store at least one reference identifier of the receiver/decoder, characterized in that, it further comprises a wireless reader to read a wireless tag containing a receiver/decoder identifier with which it is connected, and means to compare this identifier with the (Continued)

reference identifier, said security device modifying the processing of the security messages in function of the comparison result.

15 Claims, 1 Drawing Sheet

Related U.S. Application Data

(60) Provisional application No. 61/617,680, filed on Mar. 30, 2012.

(51) Int. Cl.
*H04N 21/4367* (2011.01)
*H04W 4/00* (2009.01)
*H04N 21/472* (2011.01)

(56) References Cited

U.S. PATENT DOCUMENTS

| | | | | |
|---|---|---|---|---|
| 8,624,725 B1* | 1/2014 | MacGregor | ........... | H04W 4/026 340/539.13 |
| 2002/0170054 A1* | 11/2002 | Kudelski | ................ | H04N 7/163 725/31 |
| 2003/0135471 A1* | 7/2003 | Jaquier | ................ | G06Q 20/341 705/67 |
| 2004/0232220 A1* | 11/2004 | Beenau | .................. | G01D 21/00 235/380 |
| 2005/0130585 A1* | 6/2005 | Gnuschke | ........... | H04L 65/4084 455/3.06 |
| 2006/0209774 A1* | 9/2006 | Mori | ....................... | H04L 12/18 370/338 |
| 2006/0220838 A1* | 10/2006 | Wakim | ................... | G06Q 30/02 340/539.12 |
| 2006/0258289 A1* | 11/2006 | Dua | .................. | G06F 17/30058 455/41.3 |
| 2007/0019110 A1* | 1/2007 | Cho | ....................... | H04N 5/765 348/554 |
| 2007/0052525 A1* | 3/2007 | Quan | .................. | H04L 63/0853 340/10.4 |
| 2007/0054616 A1* | 3/2007 | Culbert | .............. | H04L 63/0492 455/41.1 |
| 2007/0180485 A1* | 8/2007 | Dua | .................. | H04L 29/06027 725/114 |
| 2007/0250872 A1* | 10/2007 | Dua | ....................... | H04N 7/163 725/81 |
| 2009/0290711 A1* | 11/2009 | Bloom | .................... | H04N 7/163 380/239 |
| 2010/0150348 A1* | 6/2010 | Fairbanks | ............. | H04L 9/0863 380/255 |
| 2010/0217657 A1* | 8/2010 | Gazdzinski | ........ | G06Q 30/0251 705/14.5 |
| 2010/0245035 A1* | 9/2010 | Jeon | ................. | G08B 13/19697 340/5.8 |
| 2011/0033052 A1* | 2/2011 | Yamada | ................. | H04L 9/0877 380/270 |
| 2011/0069184 A1 | 3/2011 | Go | | |
| 2012/0161933 A1* | 6/2012 | Shin | ...................... | H04L 9/0637 340/10.1 |
| 2012/0167153 A1* | 6/2012 | Ryu | ...................... | H04N 21/478 725/109 |
| 2012/0185893 A1* | 7/2012 | Wendling | ................ | G06F 21/10 725/28 |
| 2012/0242455 A1* | 9/2012 | Hale | ...................... | G08C 17/02 340/10.1 |
| 2013/0165040 A1* | 6/2013 | McIntyre | ............ | H04L 63/0492 455/41.1 |
| 2014/0171107 A1* | 6/2014 | Kao | ..................... | G01C 21/206 455/456.1 |
| 2016/0007071 A1* | 1/2016 | Burckard | ............... | H04N 7/163 725/31 |

FOREIGN PATENT DOCUMENTS

| | | |
|---|---|---|
| WO | WO 02/052515 | 7/2002 |
| WO | WO 2006/100361 | 9/2006 |

OTHER PUBLICATIONS

Written Opinion issued in International Application No. PCT/EP2013/056962 dated Jun. 13, 2013.
English language abstract of DE 10204832 published Aug. 14, 2003.
Image File History of U.S. Appl. No. 14/388,103.

* cited by examiner

SECURITY DEVICE FOR PAY-TV RECEIVER DECODER

CROSS-REFERENCE TO RELATED APPLICATIONS

This is a Continuation application of application Ser. No. 14/388,103 filed Sep. 25, 2014, which is a National Stage of PCT/EP2013/056962 filed Apr. 2, 2013, which claims priority under 35 U.S.C. Section 119 to European Patent Application Number EP12162420.9, entitled "SECURITY DEVICE FOR PAY-TV RECEIVER DECODER", filed on Mar. 30, 2012, and to U.S. Patent Application No. 61/617,680, entitled "SECURITY DEVICE FOR PAY-TV RECEIVER DECODER", filed on Mar. 30, 2012, the contents of which are hereby incorporated by reference herein.

INTRODUCTION

This invention concerns the field of Pay-TV devices, in particular addresses how to ensure that a smart card or a CAM (Conditional Access Module) is always used in the same host device using NFC/RFID technologies. By Pay-TV device it is meant a receiver/decoder for providing access to conditional access digital content.

BACKGROUND ART

In a well-known method, in particular in the aforementioned field of Pay-TV, data is encrypted by a data supplier by means of encryption keys called control words. This data is transmitted to multimedia units of users or subscribers. Parallel to this, the control words are transmitted to these multimedia units in the form of a stream of control messages.

The multimedia units are generally made up of a processing unit that, in the case of Pay-TV, is a decoder receiving the aforementioned stream and of a security module responsible for the cryptographic operations related to the use of these streams.

As is well known to those skilled in the art, this type of security module can essentially be produced according to two distinct forms. One of these is a microprocessor card, a smart card, or more generally an electronic module (in the form of a key, of badge, . . . ). This type of module called SC is generally removable and can be connected to the decoder. The form with electrical contacts is the most widely used, however the use of a contact less connection is not excluded, for example of the ISO 14443 type. In this case, the security module process only the control messages and the control words determined by this module are sent back to the receiver for the decryption of the data (audio/video) stream.

In another embodiment, so called CAM, the data stream is passed to the CAM and the audio/video is decrypted within this module. This module is in charge of the security functions such as processing the control messages and the decryption of the data stream. For that purpose, the equivalent of the security module mentioned above is included into the CAM either as an electronic circuit or as a connectable security module.

For the clarity, these two forms will be named module SC-CAM in the description.

When the security module of the CAM has received the stream containing the control messages, they are decrypted and the expected rights contained in the messages are compared with the rights present in the security module.

In the case that the expected right (or rights) is present into the security module, the control word is passed to the descrambler in order to decrypt the audio/video data.

As is also known, each control word generally allows a small part of the data transmitted to be decrypted. Typically, one control word allows 10 seconds of a Pay-TV event to be decrypted. After this time duration, called a cryptoperiod, the control word is changed for security reasons.

When providing a module SC-CAM (such as a DVB-CI/CI+ CAM) to a consumer, a service provider may want to ensure that the module SC-CAM is not shared with friends or neighbours. A service provider in the context of the present invention therefore is responsible for managing access to conditional access digital content.

When used in host devices provided by the same service provider there are already protocols that allow checking that the right card or module is inserted in the right host device. These mechanisms are known as "pairing".

Pairing is a known mechanism that consists in sharing a unique secret between two devices thus rendering the communication between these two devices inaccessible to all other devices, since only devices who share the secret are capable of participating in the communication.

This pairing is described in application EP1078524 and allows for communication to be ensured between a security module and a receiver thanks to the presence of a unique encryption key known only by these two elements.

In an environment that allows for such connection of a security module to several host apparatuses such a pairing is not possible, as it is too restrictive.

The document WO02/052515 describes a solution that puts into practice the pairing control by means of a management centre. The security module can be paired to any apparatus as long as the management centre gives authorisation. This solution supposes the existence of a channel that allows the management centre to send one or more messages to the security module.

German Patent Application Publication number 10204832 and International Patent Application Publication number 2006/100361 also both describe similar systems in which pairing between a receiver/decoder and a security module can be achieved.

On the other hand, some retail devices (e.g. a TV set) do not allow for such paring with a module. For such devices, there is therefore a necessity to provide a different means, provided outwith the receiver/decoder hardware itself, to allow for the desired pairing.

BRIEF DESCRIPTION OF THE INVENTION

The aim of the present invention is to ensure that a security module SC or CAM is used with an authorised receiver device. Within this document, the security module may also be described as a security device.

According to a first aspect of the present invention, provision is made for system comprising:
  a receiver/decoder for providing access to conditional access digital content;
  a security device, connectable to the receiver/decoder; and
  a wireless tag, the wireless tag being attached to the receiver/decoder;
  the security device comprising:
  a memory to store at least one identifier associated with the security device and at least one system key;
  a first wireless transceiver at least to read an authorisation message from the wireless tag;

means for decrypting the authorisation message using the system key; and means to compare the decrypted authorisation message with the identifier associated with the security device, the security device configured to process at least one security message in order to extract at least one key or at least one right therefrom, said processing taking place depending on the result of said comparison;

said system characterised in that:

it further comprises a communication device having a second wireless transceiver at least to write the authorisation message to the wireless tag, the authorisation message being based at least on all or part of the identifier associated with the security module and encrypted under the system key.

According to another aspect of the present invention, there is provided a method for pairing a security device with a receiver/decoder in a system comprising:

the receiver/decoder;

the security device, connectable to the receiver/decoder, the security device comprising a first wireless transceiver and being associated with an identifier;

a wireless tag, the wireless tag being attached to the receiver/decoder; and a communication device having a second wireless transceiver;

the method comprising a step of initialisation and a step of granting, the initialisation comprising:

reading the identifier of the security device by the communications device;

preparing an authorisation message by the communications device, the authorisation message being based at least on all or part of the identifier of the communications device and being encrypted under a system key;

writing the authorisation message to the wireless tag;

and the granting comprising:

reading the authorisation message from the wireless tag;

decrypting the authorisation message by the security device;

comparing the decrypted authorisation message with the security device identifier;

allowing or disallowing the pairing depending on the result of the comparison.

Embodiments of the present invention allow for a secure pairing to be made between a user's own security device and an appliance such as a receiver/decoder by having an authorised secure communications device, preferably at the point of sale of the appliance. Advantages afforded by the invention include the fact that new security modules do not need to be manufactured for each new appliance, since the user will be allowed to continue using his existing security device; the pairing can be initiated without even powering up the new appliance, and so may even be done without unpacking the new appliance; no bandwidth-hungry EMMs are involved in authorising the pairing, as would be the case in the state of the art systems; the user will be able to use his new appliance straight away after the initialisation procedure has been carried out at the point of sale.

BRIEF DESCRIPTION OF THE FIGURES

The present invention will be better understood thanks to the attached drawings in which.

DETAILED DESCRIPTION

Figure 1:
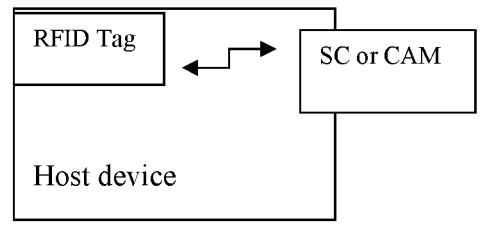
FIG. 1 illustrates a host device in connexion with the security module
Figure 2:
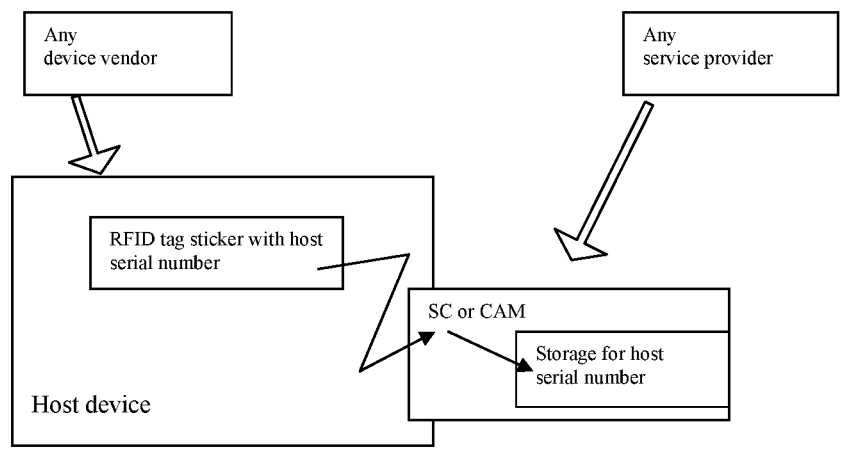
FIG. 2 illustrates the system in which the host device is connected.

The present invention concerns a security device for a Pay-TV receiver decoder, the security device being in charge of processing the security messages and extracting the keys or rights from the security messages, this security device comprising a memory to store at least one reference identifier of the receiver/decoder, characterized in that, it further comprises a wireless reader to read a wireless tag containing a receiver/decoder identifier with which it is connected, and means to compare this identifier with the reference identifier, said security device modifying the processing of the security messages in function of the comparison result.

The invention proposes a solution based on NFC or RFID technologies.

More and more assets and items, such as domestic appliances for example, embed RFID tags aimed at tracking their delivery, helping maintenance, etc.

An RFID tag or similar wireless tag embedded in a device is likely to be loaded with a unique serial number that can be read using RF communication.

The invention proposes that a CA module embeds an RFID reader or similar wireless reader that can check the serial number of the host device before enabling normal operation. The RFID reader gets the host serial number returned by the RFID tag.

As NFC cannot work over long distances this ensures that the module is very close to the host. By long distances it is meant distances which are aver about a few tens of centimeters since NFC is generally aimed at working up to between 4 to 10 centimeters. It has been shown that with a suitably adapted reader however, working distances of up to 25 cm may be achieved. The wireless communication (reader or reader/writer) referred to in the present invention therefore applies to local communication (not broadcast) between elements which are in close proximity (close being as defined above).

A typical application is to manage paring of a smart card (SC) or a CA module (CAM) with a host device such as a set-top box or a TV set.

There are technical reasons which render some host devices incapable of being paired with an SC or CAM. For instance the implementation may not allow such a feature. Or the technology that would allow pairing is not compatible with the technology of the SC or CAM.

There are also logistical reasons which prevent pairing being achieved using the connection between the host device and SC or CAM. For instance the devices may be deployed in the field without being tracked for that purpose.

Stakeholders involved in the device delivery chain may also not have any contract with service providers that own SC or CAM.

What is common to any device today is that the device has a sticker with its serial number.

Such stickers now often embed an RFID tag for logistical purposes.

Using such an RFID sticker allows for a late pairing of SC or CAM to be achieved. For example SC or CAM can be bound to retail devices in the field whatever the vendor is.

The range for communication (a few centimeters) is compatible with a paring usage as described in this invention.

Example of Use Case:

Martin has a TV at home and wishes to watch Pay-TV content proposed by a service provider SP.

Martin subscribes to SP for the Pay-TV content service.

Martin receives a SC or a CAM from SP. The SC or CAM embeds an RFID tag reader.

Martin plugs the SC or CAM into his TV for the first time. The SC or CAM gets the serial number of the host device using RFID communication (RFID tag reader) and stores it in a definitive manner. By definitive it means a one-time storage which precludes any modification unless appropriate authorisation is received.

Each time Martin wants to watch Pay-TV content from SP the SC or CAM gets the serial number using RFID communication and compares it with the serial number stored the first time. The SC or CAM allows watching as soon as the serial number is the same.

Should Martin try to plug the SC or CAM into another TV or set-top box (e.g. sharing SC or CAM with a neighbour), the SC or CAM will read the serial number of the host device, the comparison will fail and the SC or CAM will not allow viewing.

Pairing with a new device, e.g. in case Martin buys a new TV, is only possible by making SP do a particular action on SC or CAM to enable the recording of a new serial number.

The example of the serial number can be extended to any data that could be combined according to what the RFID tag can deliver, e.g. vendor, device reference.

The way the reference identifier is loaded into the security device can be manifold.

According to a first embodiment, the reference identifier is loaded during the initialization of the system i.e. the couple security device and receiver/decoder is prepared for a given user. In this case, the receiver/decoder identifier is loaded into the reference identifier of the security device.

According to a second embodiment, the reference identifier is loaded with an identifier that is contained in a RFID tag. This tag can be used to visually identify the receiver/decoder and can be affixed to the back of the receiver/decoder case or on the main board.

According to another embodiment, during the first installation process, the security device can read the tag identifier and store this identifier as reference identifier. This installation process can be triggered by the reception of a security message containing a command to setup the system. Once the security message is verified, and the command to pair the two devices is confirmed, the security device reads the tag identifier and stores this identifier into the reference memory. It is to be noted that this process can be initialled at a later stage, i.e. when the receiver/decoder is changed. The service provider can then send a security message to allow a new pairing with the newly stored identifier.

According to another embodiment, more than one identifier can be stored into the reference memory. The security device can comprise a plurality of reference memory, in the case that the final user has more than one receiver/decoder. The method described above can be applied to a plurality of receiver/decoders.

Going back to the use case mentioned above, where Martin subscribes to a service provider SP in order to receive and decrypt Pay-TV content on his TV or set-top box, a variation of this use case is now described. Martin's friend, Fischer, decides to buy Martin a new TV or set-top box. Fischer would also like for Martin to be able to immediately start using the new TV set or set-top box using the smartcard or CAM that Martin has already been using. However, he wants the whole thing to be a surprise for Martin, so the solution proposed above, where Martin has to inform the service provider of the new device and its serial number, is not appropriate in this case. Indeed, Fischer would like to be able to present the new device to Martin without even having opened up the packaging of the new device and therefore without having powered it up in order to be able to carry out the procedures mentioned above. Of course the skilled person will understand that instead of introducing Fischer into this use case, the argument still holds true for Martin himself buying the new receiver/decoder.

A solution to this problem is also provided by embodiments of the present invention. Without powering up the new TV set or set-top box (or without even opening the packaging of the new equipment), Fischer (or Martin) is able to prepare the equipment for immediate use by Martin using Martin's existing smartcard or CAM. Indeed this solution is applicable for any case where it is desirable for the pairing described above to be allowed to proceed at some time even if the receiver/decoder (appliance) happens to be powered down—it provides for the desired effect to be achieved irrespective of the power-state of the receiver/decoder (i.e. powered-up or powered-down). In keeping with this solution, according to yet another embodiment of the present invention, the security device and the Pay-TV receiver/decoder form part of a system, the system further including a communications device, in this case a, preferably secure, communications device used by a vendor at the point of sale of the new appliance. As in the previous embodiments, the receiver/decoder has a wireless tag. The wireless tag stores a receiver/decoder identifier associated with the receiver/decoder. In this embodiment, the wireless tag is further configured to store further information. This further information may be written to the wireless tag using a wireless reader/writer comprised in the communications device.

In this embodiment, it is the communications device which reads the RFID tag on the receiver/decoder to find the preferably unique identifier associated with the receiver/decoder and held within the RFID tag. The mobile communications device then communicates with the service provider to declare the existence of the new receiver/decoder intended to be used to receive and play the Pay-TV content. The declaration of the existence of the new receiver/decoder is made using the receiver/decoder's identifier. The service provider then returns an encrypted EMM to the mobile communications device. The EMM comprises a security message with a command allowing for the pairing process to be performed as mentioned above. This security message is known as an authorisation message. The mobile communications device may either decrypt the EMM to get the authorisation message and then write the authorisation message to the RFID tag on the receiver decoder using the wireless writer (or wireless reader/writer) or it may write the EMM itself to the RFID tag for later decryption. In either case, by having the mobile communications device write to the RFID tag using the information received from the service provider, the RFID tag is used as temporary storage from which the receiver/decoder may recover the information required (authorisation message) to automatically perform the pairing described above whenever the receiver/decoder is powered up and the smartcard or CAM connected. Decryption of the EMM may use a unique code associated with the receiver/decoder. The unique code could be the receiver/decoder identifier or any suitable key available to the receiver decoder. Alternatively, if the decryption of the EMM is done by the mobile communications device, then it may be done using a unique code related to the mobile communications device.

According to another embodiment, an EMM-less version of the above-described system may be realised. In this embodiment, instead of the mobile communications device receiving an EMM from the service provider, the mobile communications device receives a code from the service provider, preferably a unique code. The code may be part of a list of single-use codes. In this embodiment it is this code which serves as the authorisation message. In this embodiment there is no need for the mobile communications device to send the receiver/decoder identifier to the service provider, it just has to request the code (authorisation message). The received code is written by the mobile communications device onto the RFID tag on the receiver/decoder using the mobile communications device's wireless writer (or wireless reader/writer). When the receiver/decoder is powered up with its associated smartcard or CAM the smart card or CAM reads the receiver/decoder's RFID tag using its wireless reader (or transceiver) in order to get the receiver/decoder identifier. The smartcard or CAM then enters into communication with the service provider using the receiver/decoder's backchannel or other suitable communication channel and provides the code to the service provider. The service provider then deletes the code from its list so that the code can never be reused and sends a message back to the smartcard or CAM authorising the pairing of the receiver/decoder with the smartcard or CAM as described above. The skilled person will realise that a reader/writer is also known as a transceiver. As such, both the smartcard and the communications device can be said to comprise wireless transceivers.

Regarding the unique codes mentioned above, they may comprise a signature. The code may be generated randomly by a central system and signed to obtain the signature. The signature preferably uses a private key of the central system and a corresponding public key in order that the signature may be verified. According to this solution, thanks to the signature, a device receiving the code can verify the authenticity of the code. Other verifications procedures can be used such as a checksum or a CRC or hash on the unique value for later verification. The use of one-time codes mentioned above allows for guarding against multiple uses of the code by more than one user (in particular in the case where a first recipient transmits his code to his friends), the central system can keep track of all generated unique codes. Once one code is presented, a check can easily be made to determine if this code has already been used. In a system with no backchannel the code (or EMM) could be encrypted by a personal key of the receiver/decoder. Otherwise a backchannel can be made using the mobile communications device so that the service provider may become involved in validating the code. Where a backchannel does exist when the receiver/decoder is installed in its place of use, the code is checked by the service provider thanks to the backchannel.

Either of the embodiments mentioned in the four preceding paragraphs could be used in a token or coupon scheme where the RFID tag on the receiver/decoder is used to temporarily store a token or coupon perhaps attributed by the vendor of the receiver/decoder as a welcome gift for the new purchaser, the welcome gift being therefore attributable even if the equipment is still in its packaged form (and consequently not powered-up). In this case the vendor uses his mobile communications device to load a suitable token or coupon onto the receiver/decoder's RFID tag so that the new purchaser may enjoy a certain amount of free Pay-TV content using the coupon or token in a process of pairing as described above.

According to yet another embodiment of the present invention, combinable with any of the other embodiments mentioned herein, the vendor has a preferably secure communications device and it is the vendor's secure communications device which initiates or authorises a pairing between Martin's security device and the new receiver/decoder when Martin comes to the point of sale to buy the new receiver/decoder. In this way there is no need to wastefully manufacture a new security card for each new receiver/decoder sold, since the user just keeps his existing security device (card). Furthermore there is no need for the service provider to generate EMMs to authorise users to perform pairing. This saves on valuable bandwidth since EMMs generally have to be transmitted many times to ensure that the intended recipient receives it. According to this embodiment there is provided a system comprising the receiver/decoder, the security device and the communications device. The receiver/decoder has a wireless tag attached to it. The security device also has an identifier associated with it and this identifier is entered into the communications device. Such entering may be by any means such as manual entering, or by inserting the security device (usually in the form of a card) into a suitable slot in the communications device where a suitable reader will read the identifier or using an infrared reader on the communications device or the wireless transceiver of the communications device can communicate with the wireless transceiver of the security device to obtain the identifier. The communications device, using a processor integrated within it, builds an authorisation message based at least on all or part of the security device's identifier and encrypts the authorisation message using a system encryption key, which is known by the security device. The communications device then writes the encrypted authorisation message to the wireless tag on the receiver/decoder using its wireless transceiver. Now, whenever the receiver/decoder is powered up and the security module is connected to the receiver/decoder, a pairing may be performed, whereby the security device reads the authorisation message from the wireless tag, using its wireless transceiver, decrypts the authorisation message and compares the result with its own identifier. If there is a positive match, then the pairing is successful and decryption of content received by the receiver/decoder is allowed to go ahead. According to another embodiment, the security device comprises a counter to keep track of how many new pairings are being made in order to be able to stop further pairing if an upper limit of number of pairings is reached.

The invention claimed is:
1. A system comprising:
a receiver/decoder for providing access to conditional access digital content;
a security device, directly connectable to the receiver/decoder via a first communication channel;
a data storage device having an authorization message stored thereon, the authorization message being based at least on all or part of an identifier associated with the security device and encrypted under a system key, the data storage device being physically attached to the receiver/decoder;
the security device comprising:
a memory to store at least one identifier associated with the security device and the system key;
a first wireless transceiver at least to read the authorization message from the data storage device via a second communication channel different from the first communication channel; and a processor configured to:
decrypt the authorization message using the system key;
compare the decrypted authorization message with the identifier associated with the security device; and
process at least one security message in order to extract at least one key or at least one right therefrom, said processing taking place depending on the result of said comparison.

2. The system according to claim 1, wherein the communications device is configured to read the identifier from the security device using the second transceiver or an infrared reader or a card reader.

3. The system according to claim 1, wherein the first and second wireless transceivers are configured to operate within a range of less than 25 cm from the data storage device.

4. The system according to claim 1, wherein the first and second wireless transceivers are configured to operate within a range of less than 10 cm from the data storage device.

5. The system according to claim 1, wherein the data storage device is adhered to the receiver/decoder.

6. The system according to claim 1, wherein the data storage device employs near field communications (NFC) to communicate with the security device.

7. The system according to claim 1, wherein the data storage device is a radio frequency identification (RFID) tag.

8. A method for pairing a security device with a receiver/decoder, comprising:
reading, via a first wireless communication channel, an identifier associated with the security device by a communications device, the security device comprising a first wireless transceiver, the communication device comprising a second wireless transceiver, the security device being directly connectable to a receiver/decoder via a second communication channel different from the first wireless communication channel;
preparing an authorization message by the communications device, the authorization message being based at least on all or part of the identifier of the security device and being encrypted under a system key;
writing the authorization message to a data storage device, the data storage device being physically attached to the receiver/decoder;
reading by the security device the authorization message from the data storage device;
decrypting the authorization message by the security device;
comparing the decrypted authorization message with the security device identifier; and
allowing or disallowing the pairing depending on the result of the comparison.

9. The method according to claim 8, wherein said reading of the security device identifier takes place between the first and second wireless transceivers, said writing of the authorization message being done by the second wireless transceiver and said reading of the authorization message being done by the first wireless transceiver.

10. The method according to claim 8, wherein the data storage device is adhered to the receiver/decoder.

11. The method according to claim 8, wherein the data storage device employs near field communications (NFC) to communicate with the security device.

12. The method according to claim 8, wherein the data storage device is a radio frequency identification (RFID) tag.

13. The method of claim 8, wherein the communications device is configured to read the identifier from the security device using the second transceiver or an infrared reader or a card reader.

14. The method of claim 8, wherein the first and second wireless transceivers are configured to operate within a range of less than 25 cm from the data storage device.

15. The method of claim 8, wherein the first and second wireless transceivers are configured to operate within a range of less than 10 cm from the data storage device.

* * * * *